United States Patent
Brust et al.

(10) Patent No.: US 10,589,547 B2
(45) Date of Patent: Mar. 17, 2020

(54) INKJET PRINTER HAVING AN AERODYNAMIC ELEMENT FOR REDUCING TURBULENCES

(71) Applicant: Océ Holding B.V., Venlo (NL)

(72) Inventors: Matthias Brust, München (DE); Egor Mohilnik, München (DE)

(73) Assignee: Océ Holding B.V., Venlo (NL)

( * ) Notice: Subject to any disclaimer, the term of this patent is extended or adjusted under 35 U.S.C. 154(b) by 0 days.

(21) Appl. No.: 16/194,993

(22) Filed: Nov. 19, 2018

(65) Prior Publication Data
US 2019/0160833 A1    May 30, 2019

(30) Foreign Application Priority Data
Nov. 24, 2017   (DE) .................. 10 2017 127 841

(51) Int. Cl.
| | |
|---|---|
| *B41J 11/00* | (2006.01) |
| *B41J 13/10* | (2006.01) |
| *G11B 23/03* | (2006.01) |
| *B41J 13/00* | (2006.01) |
| *B41J 13/08* | (2006.01) |
| *B41J 11/06* | (2006.01) |

(52) U.S. Cl.
CPC .......... *B41J 11/007* (2013.01); *B41J 11/0085* (2013.01); *B41J 11/06* (2013.01); *B41J 13/0063* (2013.01); *B41J 13/08* (2013.01); *B41J 13/10* (2013.01); *G11B 23/03* (2013.01)

(58) Field of Classification Search
CPC ...... B41J 11/007; B41J 13/08; B41J 13/0063; B41J 13/10; B41J 11/06; B41J 11/0085; G11B 23/03

USPC ........................................................ 347/104
See application file for complete search history.

(56) References Cited

U.S. PATENT DOCUMENTS

| | | | |
|---|---|---|---|
| 6,062,752 A * | 5/2000 | Pierce ................... | B41J 11/005 400/522 |
| 7,101,096 B2 * | 9/2006 | Sasai ....................... | B41J 2/01 347/104 |
| 7,597,187 B2 | 10/2009 | Bausenwein et al. | |
| 2002/0018097 A1 | 2/2002 | Kitahara et al. | |
| 2003/0043252 A1 | 3/2003 | Kerr et al. | |
| 2008/0123476 A1* | 5/2008 | Liu ........................ | G11B 17/225 369/30.28 |
| 2009/0295897 A1* | 12/2009 | Komuro ................. | B41J 3/4071 347/104 |
| 2010/0033773 A1* | 2/2010 | Hoshi ................. | H04N 1/00795 358/475 |
| 2010/0225719 A1 | 9/2010 | Takatsuka | |

(Continued)

FOREIGN PATENT DOCUMENTS

DE   102007014876 A1   10/2008

OTHER PUBLICATIONS

German action dated May 3, 2018—application No. 10 2017 127 841.9.

*Primary Examiner* — Stephen D Meier
*Assistant Examiner* — Alexander D Shenderov
(74) *Attorney, Agent, or Firm* — Schiff Hardin LLP (57) ABSTRACT

An inkjet printer having at least one print head in which an aerodynamic element is placed before (e.g. in a transport direction) a recording medium (e.g. in the form of a sheet or page or plate) to reduce or avoid turbulences that may arise due to the relative motion between print head(s) and recording medium at an edge of the recording medium.

17 Claims, 2 Drawing Sheets

(56) References Cited

U.S. PATENT DOCUMENTS

2011/0057382 A1\* 3/2011 Shinozaki .............. B41J 3/4071
271/110
2016/0214410 A1\* 7/2016 Hamada ................... B41J 11/58

\* cited by examiner

INKJET PRINTER HAVING AN AERODYNAMIC ELEMENT FOR REDUCING TURBULENCES

CROSS REFERENCE TO RELATED APPLICATIONS

This patent application claims priority to German Patent Application No. 102017127841.9, filed Nov. 24, 2017, which is incorporated herein by reference in its entirety.

BACKGROUND

The disclosure relates to an inkjet printer with which a recording medium in the form of a sheet or page or plate may be printed to. In particular, the disclosure relates to the transport of a recording medium in the form of a sheet or page or plate through the print group of an inkjet printer.

An inkjet printer typically includes a print group having one or more print bars for different inks. A print bar may thereby have one or more print heads with respectively one or more nozzles. For printing to a recording medium, the recording medium and a print head may be moved relative to one another in order to print the image dots of different lines of a print image bit by bit onto the recording medium.

Given the use of recording media in the form of sheets or pages or plates, inaccuracies in the positioning of dots of a print image on the recording medium may occur due to the relative movement between a recording medium and a print head. This applies in particular given recording media in the form of plates, such as corrugated board, that may have a thickness of up to, for example, 1 cm.

US2003/0043252A1 describes a printer that has a roller with a rocker for transport of a page. US 2010/0225719A1 describes a transport unit for an inkjet printer. US2002/0018097A1 describes a transport belt for a printer. DE102007014876A1 describes a transport system for CDs.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure includes increasing the positioning accuracy of dots in the printing to a recording medium in the form of a sheet or page or plate in an inkjet printer.

According to one aspect of the disclosure, an inkjet printer is described for printing to a recording medium in the form of a sheet or page or plate. In an exemplary embodiment, the printer includes at least one print head having one or more nozzles arranged in a nozzle plate. The printer can also include at least one movement means that is configured to move the print head and a recording medium in the form of a sheet or page or plate relative to one another in a transport direction in order to print dots of a print image onto the recording medium. In an exemplary embodiment, the movement means is designed to move the print head and the recording medium such that, as of an intake edge of the recording medium, the recording medium is arranged at least partially below the nozzle plate, wherein a clearance below the nozzle plate as of the intake edge corresponds to a reference clearance. In an exemplary embodiment, the movement means has an aerodynamic element that is designed to approximate the clearance below the nozzle plate to the reference clearance in a region that extends in the transport direction before the intake edge, starting from said intake edge, in particular to match the reference clearance.

According to a further aspect of the disclosure, an inkjet printer is described for printing to a recording medium in the form of a sheet or page or plate. The printer can include at least one print head having one or more nozzles arranged in a nozzle plate. Moreover, the printer includes at least one movement means that is configured to move the print head and a recording medium in the form of a sheet or page or plate relative to one another in a transport direction in order to print dots of a print image onto the recording medium. In an exemplary embodiment, the movement means may be configured such that an air flow produced by the relative motion between print head and recording medium is essentially free of eddies and/or turbulence in a clearance below the nozzle plate at an intake edge of the recording medium as of which the nozzle plate is positioned at least partially over the recording medium. Alternatively or additionally, the movement means may be designed such that the clearance below the nozzle plate remains essentially invariant in size at the intake edge. This may be achieved via use of a correspondingly designed aerodynamic element, for example.

Figure 1A:
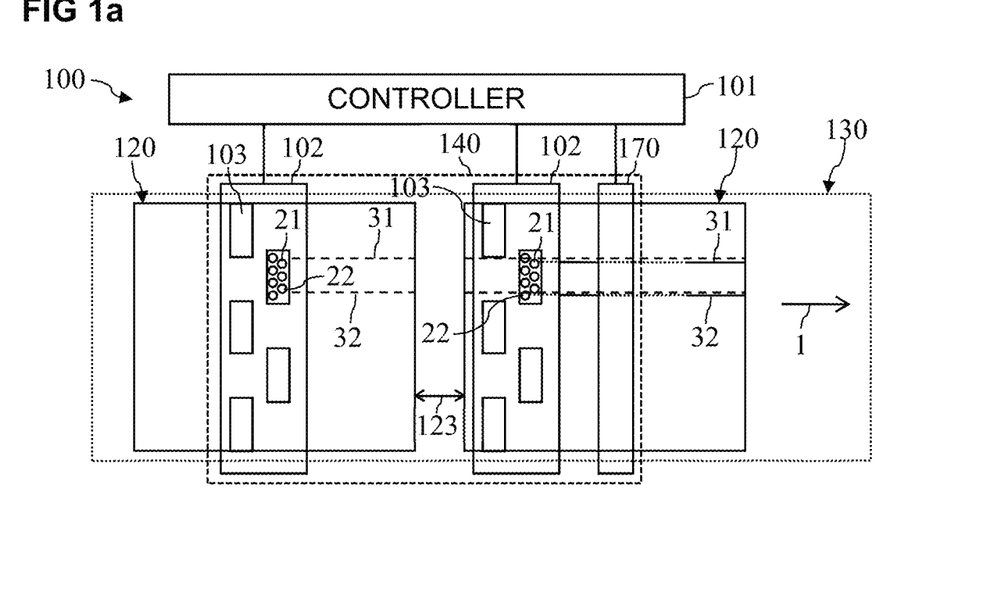
FIG. 1a illustrates a block diagram of an example of an inkjet printer according to an exemplary embodiment of the present disclosure.

FIG. 1a shows a printer 100 according to an exemplary embodiment. The printer 100 can be configured to print to a recording medium 120 in the form of a sheet or page or plate. The recording medium 120 may be produced from paper, paperboard, cardboard, metal, plastic, textiles, a combination thereof, and/or other materials that are suitable and can be printed to. The recording medium 120 is directed by a conveyor or other movement means 130, along the transport direction 1 (represented by an arrow) through the print group 140 of the printer 100. Successive recording media 120 thereby typically exhibit a defined distance 123 from one another (which is referred to as a conveying distance in this document). In an exemplary embodiment, the conveyor 130 includes, for example, a conveyor belt on which a recording medium 120 is placed.

In an exemplary embodiment, the print group 140 of the printer 100 includes two print bars 102, where each print bar 102 may be used for printing with ink of a defined color (for example, black, cyan, magenta and/or yellow, and possibly Magnetic Ink Character Recognition (MICR) ink). Different print bars 102 may be used for printing with respective different inks. Furthermore, the print group 140 may include at least one fixer 170 that is configured to fix a print image printed onto the recording medium 120. A fixer 170 may possibly be arranged after each print bar 102 in order to at least partially fix the print image applied by the respective print bar 102.

A print bar 102 may include one or more print heads 103 that are possibly arranged next to one another in multiple rows in order to print the dots of different columns 31, 32 of a print image onto the recording medium 120. In the example depicted in FIG. 1a, a print bar 102 includes five print heads 103, wherein each print head 103 prints the dots of one group of columns 31, 32 of a print image onto the recording medium 120.

In the embodiment depicted in FIG. 1a, each print head 103 of the print group 140 includes multiple nozzles 21, 22, wherein each nozzle 21, 22 is configured to fire or push ink droplets onto the recording medium 120. For example, a print head 103 of the print group 140 may include multiple thousands of effectively used nozzles 21, 22 that are arranged along multiple rows transversal to the transport direction 1 of the recording medium 120. The nozzles 21, 22 in the individual rows may be arranged offset from one another. Dots of a line of a print image may be printed onto the recording medium 120, transversal to the transport direction 1 (meaning along the width of the recording medium 120), by means of the nozzles 21, 22 of a print head 103 of the print group 140.

In an exemplary embodiment, the printer 100 also includes a controller 101 (for example, an activation hardware) that is configured to activate the actuators of the individual nozzles 21, 22 of the individual print heads 103 of the print group 140 in order to apply the print image onto the recording medium 120 depending on print data. In an exemplary embodiment, the controller 101 includes processor circuitry that is configured to activate the actuators and/or perform one or more other functions (e.g. control the overall operation of) the printer 100.

The print group 140 of the printer 100 thus includes at least one print bar 102 having K nozzles 21, 22 that may be activated with a specific line clock in order to print a line (transversal to the transport direction 1 of the recording medium 120) with K pixels or K columns 31, 32 of a print image onto the recording medium 120. The nozzles 21, 22 may be distributed among one or more print heads 103. In the depicted example, the one or more print heads 103 are installed immobile or fixed in the printer 100, and the recording medium 120 is directed past the stationary nozzles 21, 22 with a defined transport velocity. Alternatively or additionally, the one or more print heads 103 may be moved across the recording medium 120 (for example transversal to the transport direction 1 of the recording medium 120).

Figure 1B:
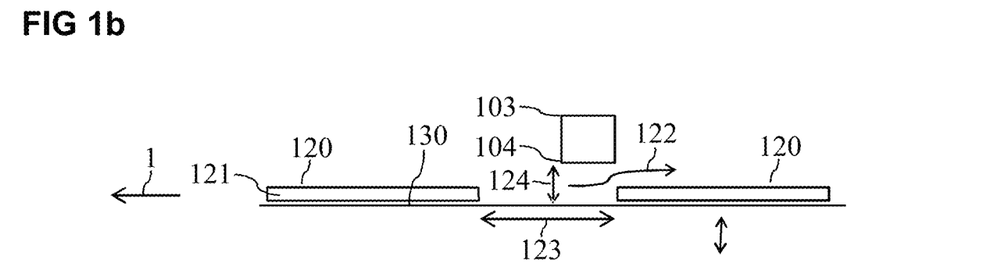
FIG. 1b illustrates a lateral view of a print head and a recording medium according to an exemplary embodiment of the present disclosure.

FIG. 1b shows a recording medium 120 that is directed past a print head 103 in the transport direction 1 by a conveyor 130 (for example on a conveyor belt). On the side facing toward the recording medium 120, the print head 103 has a nozzle plate 104 on which are arranged the outputs of the one or more nozzles 21, 22 of the print head 103. Furthermore, FIG. 1b illustrates the conveying distance 123 between two recording media 120 in direct succession.

As is clear from FIG. 1b, upon transport of individual recording media 120 in the form of sheets or pages or plates, the clearance 124 below the nozzle plate 104—meaning the distance between the nozzle plate 104 of a print head 103 and a solid medium situated thereunder (for example the conveyor belt or the recording medium 120)—is not constant. Rather, the clearance 124 changes regularly by the magnitude of the thickness of the recording medium 120. A recording medium 120 directed through the clearance 124 thus generates an eddy-like and/or turbulent and/or non-laminar air flow 122 that may have a disturbing influence on the positioning of the ink droplets. In particular, given a relatively thick recording medium 120 (for example given corrugated board), an eddy-like and/or turbulent air flow 122 may be generated at the intake edge 121 of the recording medium 120, due to which ink droplets exiting at the nozzle plate 104 may be deflected. Such a (typically uncontrolled) deflection of the ink droplets may then lead to an inaccurate positioning of the corresponding dots on the recording medium 120.

The extent of eddies or turbulence in an air flow 122 typically increases with the thickness of the recording medium 120. In particular, significant air vortices may be generated at the intake edge 121 of a recording medium 120 if the thickness of the recording medium 120 is within the order of magnitude of the printing gap between the nozzle plate 104 and the recording medium 120, or is greater than this. The printing gap corresponds to the clearance of nozzle plate 104 and top side of the recording medium 120. The printing gap is typically constant (in order to enable a high print quality). The printing gap may, for example, have a reference gap measurement in the range of 1 mm. The thickness of the recording medium 120 be in the range from 1 mm to 9 mm (in particular given corrugated board).

In the present disclosure, an inkjet printer 100 is described for printing to a recording medium 120 in the form of a sheet or page or plate, in which inkjet printer 100 incorrect dot positionings on a recording medium 120 (in particular at the intake edge 121 of the recording medium 120) may be reduced and/or avoided, and/or given which the air flow above the recording medium 120 in the form of a sheet or page or plate may be kept as laminar as possible.

In an exemplary embodiment, the printer 100 includes at least one print head 103 having one or more nozzles 21, 22 arranged on a nozzle plate 104. The outputs of the one or more nozzles 21, 22 are thereby typically arranged at the nozzle plate 104 of the print head 103. The one or more nozzles 21, 22 may be activated depending on print data in order to print dots of a print image that is to be printed onto the recording medium 120 via the ejection of ink droplets.

In an exemplary embodiment, the printer 100 also includes at least one movement means 130 (also referred to as a conveyor in this document) that is configured to move the print head 103 and a recording medium 120 in the form of a sheet or page or plate in a transport direction 1 relative to one another in order to print dots of a print image onto the recording medium 120. In particular, the recording medium 120 may be directed past the (stationary) print head 104 by the movement means 130 in order to print the dots of different lines of a print image bit by bit onto the recording medium 120. If applicable, each nozzle 21, 22 may thereby be associated with precisely one column 31, 32 of a print image.

The movement means 130 may be configured to sequentially direct different recording media 120 in the form of a sheet or page or plate past the print head 103 in order to print to the different recording media 120. Alternatively or additionally, the print head 103 may be sequentially directed past different recording media 120 in the form of a sheet or page or plate. Recording media 120 that are directly adjacent may thereby have a defined conveying distance 123 from one another. The different recording media 120 may possibly have different sizes and/or thicknesses.

The movement means 130 is designed to move the print head 103 and a recording medium 120 relative to one another such that the recording medium 120 is arranged at least partially below the nozzle plate 104 as of an intake edge 121 of said recording medium 120. In other words, the print head 103 and the recording medium 120 may meet one another for the first time at the intake edge 121 of the recording medium 120 (after traversing the conveying distance 123 between a previously printed recording medium 120 and the recording medium 120 to be printed). The printing of a print image onto the recording medium 120 may thus begin at the intake edge 121 of the recording medium 120 and then continue sequentially up to an opposite discharge edge of the recording medium 120.

As is depicted in FIG. 1b, a turbulent air flow 122 may form at the intake edge 121 of the recording medium 120. The turbulent air flow may in particular form as a result of a clearance 124 below the nozzle plate 104. The clearance 124 below the nozzle plate 104 may correspond to a defined (constant) reference clearance (for example in the range of 1 mm) (what is known as the printing gap) as of the intake edge 121. On the other hand, the recording medium 120 has a defined thickness (for example in the range of 1 mm to 9 mm) so that the clearance 124 below the nozzle plate 104 is typically greater than the reference clearance by the thickness of the recording medium 120 in a region directly before the intake edge 121. Such a variation of the clearance 124 may lead to turbulences, and thus to incorrect dot positionings.

In one or more exemplary embodiments, with reference to FIGS. 2a, 2b, and 3, the movement means 130 may include an aerodynamic element 205, 305 (also referred to as an aerodynamic component in this document) that is designed to converge the clearance 124 below the nozzle plate 104 to the reference clearance—in particular to match the reference clearance—starting from the intake edge 121 in the transport direction 1 before said intake edge 121. For example, the aerodynamic element 105, 305 may include a ramp that continuously reduces the clearance 124 below the nozzle plate 104 while approaching the intake edge 121. Alternatively or additionally, the aerodynamic element 205, 305 may have a flat surface, at least in regions, that travels parallel to the surface of the recording medium 120 (said surface facing toward the nozzle plate 104) and that is preferably at the same height as the surface of the recording medium 120. In particular, the surface of the aerodynamic element 205, 305, which surface faces toward the nozzle plate 104, may be at the same height as the surface of the recording medium 120 at the intake edge 121.

An inkjet printer 100 having at least one print head 103 is thus described in which an aerodynamic element 205, 305 is placed before (in the transport direction 1) a recording medium 120 in the form of a sheet or page or plate in order to reduce or avoid turbulences that may arise at the intake edge 121 of the recording medium 120 due to the relative motion between print head 103 and recording medium 120. The print quality of the printer 100 may thus be increased (in particular upon printing to relatively thick recording media 120).

Figure 2A:
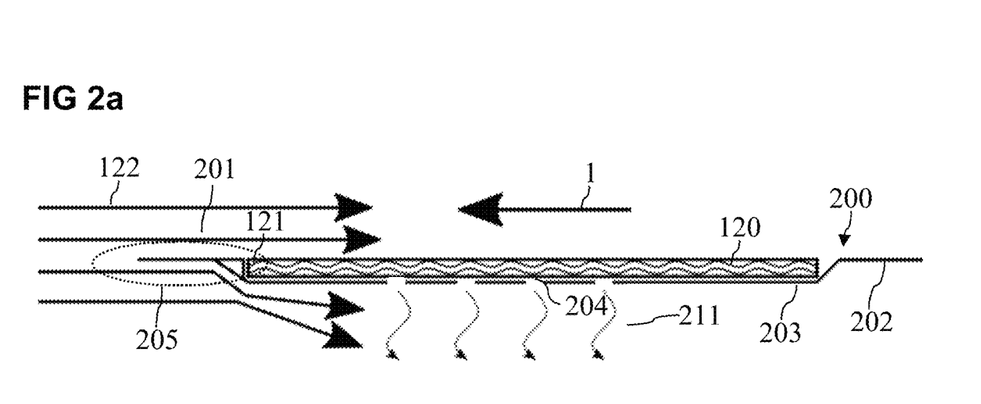
FIG. 2a illustrates a carrier for a recording medium according to an exemplary embodiment of the present disclosure.
Figure 2B:
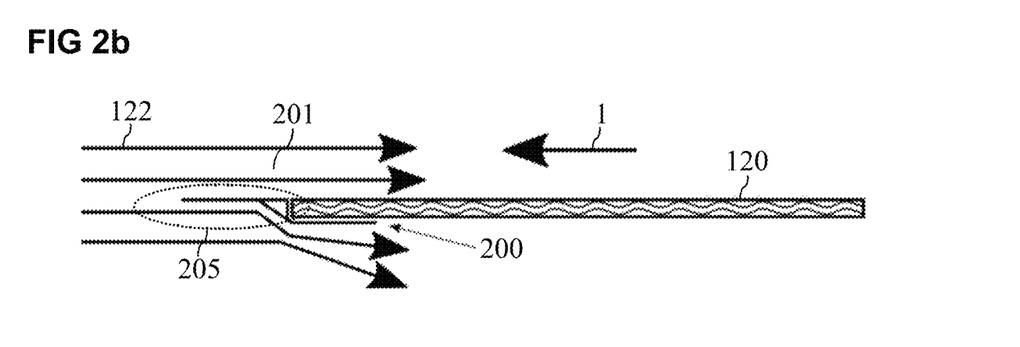
FIG. 2b illustrates a carrier for a recording medium according to an exemplary embodiment of the present disclosure.

FIGS. 2a and 2b show an example of a carrier 200 that may be moved by the movement means or the conveyor 130 of a printer 100 in order to direct a recording medium 120 past a print head 130. The movement means may, for example, have one or more conveyor rails in order to move a carrier 200. The carrier 200 depicted in FIGS. 2a and 2b is designed as a sled for accommodation of a recording medium 120.

In the example depicted in FIG. 2a, the floor of the carrier 200 has bores/holes 204 so that suction forces 211 (in particular a negative pressure) with which the recording medium 120 is held in the carrier 200 are produced by a portion of the air current 122 that travels below the carrier 200. The bores 204 may thereby travel at an angle (counter to the transport direction 1) in order to increase the suction forces 211 or the negative pressure. Moreover, a negative pressure may be actively generated via suitable means in order to keep the recording medium 120 firmly in the carrier 200.

A carrier 200 is preferably shaped such that the top edge or top side of the recording medium 120 is on a plane with a high point of the carrier 200. The high point, situated at the intake edge 121 of the recording medium 120, thus represents an aerodynamic element 205. Via the high point, it may be achieved that the relative air flow 122 above the recording medium 120 and the carrier 200 does not swirl and remains laminar to the greatest possible extent. The aerodynamic element 205 may be shaped such that possible turbulences in the air flow 122 that arise on a front side of the aerodynamic element 205 are directed to the underside of the recording medium 120, and therefore do not negatively affect the printing process.

FIG. 2b shows a shortened variant of a carrier 200 (in particular of a sled). In this instance, only a forward part of the recording medium 120 is directed by the carrier 200. Recording media 120 with different lengths may be directed in the transport direction 1 with the carrier 200 depicted in FIG. 2b.

The movement means 130 of a printer 100 may thus include a carrier 200 that is configured to accommodate the recording medium 120 at least in regions of the carrier 200. In an exemplary embodiment, the carrier 200 includes a lowered region 203 to accommodate the recording medium 120. Furthermore, the carrier 200 may have the aerodynamic element 205 in a front region 201 that is arranged before (with regard to the transport direction 1) the lowered region 203. Via the use of such a carrier 200, recording media 120 may be reliably directed through the print group 140 of a printer 100, as free of turbulence as is possible. In an exemplary embodiment, the carrier 200 is a sled. In another embodiment, the carrier 200 is a tray or other supporting means, support, or support member.

In an exemplary embodiment, the top side of the aerodynamic element 205, which top side faces toward the nozzle plate 104, is level with the top side of the recording medium 120 if the recording medium 120 is arranged in the lowered region 203 of the carrier 200. The top side of the aerodynamic element 205 may thereby travel over a defined minimum distance at the same level as the top side of the recording medium 120. The minimum distance is thereby sufficiently large in order to ensure that turbulences of the air flow 122 that arise at a front side (in relation to the transport direction 1) of the aerodynamic element 205 have significantly decayed at the intake edge 121 of the recording medium 120. In an exemplary embodiment, for this purpose, the minimum distance is dependent on the velocity of the relative motion between the print head 103 and the recording medium 120. For example, the minimum distance may be extended with increasing velocity.

In an exemplary embodiment, alternatively or additionally, the aerodynamic element 205 of the carrier 200 is configured such that possible turbulences of the air flow 122 that are generated on the front side of the aerodynamic element 205 are directed toward the underside of the carrier 200 and/or of the recording medium.

In an exemplary embodiment, the lowered region 203 of the carrier 200 forms a trough to accommodate the recording medium 120. A reliable transport of a recording medium 120 may thus be produced. Alternatively, the lowered region 203 of the carrier 200 may be designed to accommodate only a partial region of the recording medium 120, starting from the intake edge 121. Recording media with different lengths may thus be flexibly printed to within a printer 100.

In an exemplary embodiment, the carrier 200 includes an additional aerodynamic element in a rear region 202 arranged after (with regard to the transport direction 1) the lowered region 203. An aerodynamic element may thus also be provided at the discharge edge of a recording medium 120. Turbulences of the air flow 122 may thus be further reduced.

In an exemplary embodiment, the movement means 130 (e.g. carrier 200) includes a floor that is configured to at least partially bear/support the recording medium 120. In an exemplary embodiment, the aerodynamic element 205 is configured such that the air flow 122 produced by the relative motion between the print head 103 and the recording medium 120 travels at least in part below the floor of the carrier 200. In an exemplary embodiment, the floor is configured such that a suction force 211 on the recording medium 120 toward the floor is produced due to the air flow 122 traveling below the floor (for example, the floor may have bores 204 that are configured to generate the suction force 211). Advantageously, the recording medium 120 is reliably directed past a print head 103. In particular, the undulation of a recording medium 120 upon printing a print image may be reduced via the suction force 211. The print quality of a printer 100 may thus be further reduced. If applicable, the suction force 211 may be actively increased (for example by means of a negative pressure pump) in order to further reduce the undulation of a recording medium 120.

Figure 3:
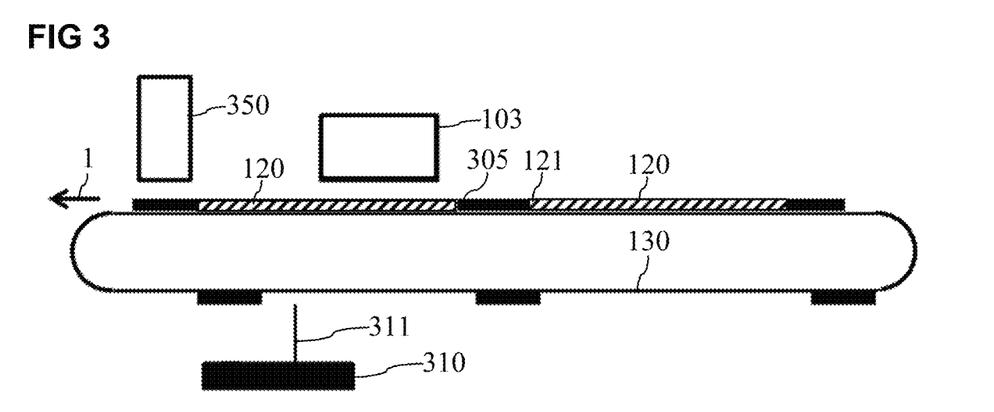
FIG. 3 illustrates a conveyor belt with fill templates for recording media according to an exemplary embodiment of the present disclosure.

In an exemplary embodiment, as shown with reference to FIG. 3, the movement means 130 is configured as a conveyor belt. The conveyor belt or transport belt shown in FIG. 3 has a fill template to receive recording media 120. The gaps between the recording media 120 in the form of a sheet or page or plate are thereby filled by an aerodynamic element 305. In an exemplary embodiment, the aerodynamic element 305 is a block with the thickness of the recording medium 120, so that the clearance 124 below the nozzle plate 104 always remains constant at the reference clearance. A laminar, eddy-free air flow 122 may thus be particularly reliably generated. In an alternative embodiment, the block has a thickness that is greater than the recording medium 120.

In an exemplary embodiment, the movement means 130 includes a conveyor belt that is designed to carry one or more recording media 120 and direct them past a print head 103. The aerodynamic element 305 may then be arranged on the conveyor belt. In particular, as depicted in FIG. 3, the conveyor belt may have a plurality of aerodynamic elements 305 that are arranged spaced apart from one another on the conveyor belt, such that a fill template is formed for receiving at least one recording medium 120 (in particular for receiving a corresponding plurality of recording media 120). The fill template may be designed such that the clearance 124 below the nozzle plate 104 remains essentially constant in the printing operation. A reliable and precise dot positioning may thus be produced.

In an exemplary embodiment, the aerodynamic element 205, 305 is arranged in a region between two successive recording media 120. In an exemplary embodiment, the aerodynamic element 205, 305 thereby has a flat surface on the top side facing toward the nozzle plate 104. The printer 100 may be configured to print a regeneration print image and/or test print image (for example refresh lines) for regeneration and/or monitoring of the one or more nozzles 21, 22 onto the surface of the aerodynamic element 205, 305, using the print head 103. On the other hand, print data-dependent or user data-dependent print images may be printed onto the recording media 120. The aerodynamic elements 205, 305 that are arranged between the recording media 120 may thus be used to implement regeneration and/or test measures for the print head 103. The spoilage generated by the printer 100 may thus be reduced or avoided. Furthermore, the excising of regeneration and/or test print images may thus be avoided.

Refresh lines and/or control elements, for example an NFD (Nozzle Failure Detection) chart, may be printed on the front sled web (from FIGS. 2a and 2b) and/or onto the fill template (from FIG. 3), for example. These may be detected by a sensor 350 of the printer 100. The sensor 350 may, for example, include an inline scanner and/or an image camera. The sensor data of the sensor 350 may be evaluated in order to increase the reliability and/or the print quality of the printer 100. If applicable, multiple layers of print images may thereby be printed onto the surface of an aerodynamic element 205, 305. The detected sensor data may be stored in a memory to document the print quality. A storage of physical test print images may thus be avoided.

In an exemplary embodiment, the surface of the aerodynamic element 205, 305 (for example a coating on the surface of the aerodynamic element 205, 305) is configured such that the surface exhibits a behavior with regard to a flow of ink that is identical, or at least similar, to that of a recording medium 120. On the other hand, the surface of the aerodynamic element 205, 305 may have an adhesion for ink that is reduced or increased relative to the recording medium 120.

In an exemplary embodiment, as illustrated in FIG. 3, the printer 100 includes a cleaner 310 that is configured to clean an aerodynamic element 205, 305. For this purpose, the cleaner 310 may have a wiper 311. Given use of a conveyor belt, the cleaning of an aerodynamic element 205, 305 may take place at every revolution of the conveyor belt. A repeated printing to the aerodynamic element 205, 305 may be enabled via the regular cleaning of the surface of an aerodynamic element 205, 305.

In this document, an inkjet printer 100 for printing to a recording medium 120 in the form of a sheet or page or plate is thus described. The printer 100 includes at least one print head 103 having one or more nozzles 21, 22 arranged on a nozzle plate. Moreover, the printer 100 includes at least one movement means 130 that is configured to move the print head 103 and a recording medium 120 in the form of a sheet or page or plate relative to one another in a transport direction 1 in order to print dots of a print image onto the recording medium 120 (possibly line by line).

In an exemplary embodiment, the movement means 130 is configured such that the air flow 122 produced in the clearance 124 below the nozzle plate 104 due to the relative motion between print head 103 and recording medium 120 is essentially free of eddies and/or turbulence at the intake edge 121 of the recording medium 120. In an exemplary embodiment, alternatively or additionally, the movement means 103 is configured such that the clearance 124 below the nozzle plate 104 remains essentially unchanged in size at the intake edge 121.

Suction holes may be arranged in the conveyor 130 (in particular in a conveyor belt) for the recording medium 120, in which suction holes a negative pressure is developed in order to pull the recording medium 120 onto the conveyor belt (and thus to reliably move said recording medium 120 through the printer 100). These suction holes are for the most part not covered in the gaps between two recording media 120. Due to the negative pressure, air is then drawn downward through the suction holes so that an additional air current arises (that may travel in and/or counter to the transport direction 1). This air current may have a negative effect on the droplet positioning, in particular at the intake edge 121 of a recording medium 120. In particular, turbulences may be produced at the intake edge 121 of a recording medium 120 due to this air current. The negative effects of such an air current are reduced by the measures described in this document (in particular given use of a carrier 200) or completely remedied (in particular given use of a fill template).

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, other structural electronic hardware, or a combination thereof. A processor includes a microprocessor, a digital signal processor (DSP), central processing unit (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 transport direction
21, 22 nozzle
31, 32 column (of the print image)
100 printer
101 controller
102 print bar
103 print head
104 nozzle plate
120 recording medium
121 intake edge (recording medium)
122 air flow
123 conveying distance 124 clearance
130 movement means (conveyor)
140 print group
170 fixer
200 carrier
201 front region
202 rear region
203 lowered region
204 bore
205 aerodynamic element (sled)
211 suction force
305 aerodynamic element (conveyor belt)
310 cleaner
311 wiper
350 sensor

The invention claimed is:

1. An inkjet printer for printing to a recording medium, comprising:
a print head having one or more nozzles arranged in a nozzle plate; and
a conveyor configured to move the recording medium in a transport direction relative to the print head to print a print image onto the recording medium and such that at least an intake edge of the recording medium is arranged below the nozzle plate, wherein a clearance below the nozzle plate as of the intake edge corresponds to a reference clearance wherein the conveyor includes:
a conveyor belt configured to carry the recording medium and direct the recording medium past the print head; and
an aerodynamic element arranged on the conveyor belt and configured to match the clearance below the nozzle plate in a region that extends before the intake edge in the transport direction, starting from the intake edge to the reference clearance so that a flat top side of the aerodynamic element facing toward the nozzle plate at the intake edge is at a same height as a top side of the recording medium facing toward the nozzle plate, wherein at least a portion of the flat top side of the aerodynamic element travels parallel to the top side of the recording medium.

2. Inkjet printer according to claim 1, wherein:
the conveyor comprises a carrier configured to accommodate at least portions of the recording medium;
the carrier comprises a lowered region configured to accommodate the recording medium; and
the carrier comprises the aerodynamic element in a front region of the carrier that is arranged before the lowered region with respect to the transport direction.

3. The inkjet printer according to claim 1, wherein:
the flat top side of the aerodynamic element facing toward the nozzle plate is level with the top side of the recording medium if the recording medium is arranged in a lowered region of the carrier; and/or
the top side of the aerodynamic element travels over a minimum distance at a same level as the top side of the recording medium, the minimum distance depending on a velocity of the relative motion between the print head and the recording medium.

4. The inkjet printer according to claim 2, wherein:
the lowered region of the carrier forms a trough configured to accommodate the recording medium; and/or
the carrier includes an additional aerodynamic element in a rear region arranged after the lowered region with respect to the transport direction.

5. The inkjet printer according to claim 2, wherein the lowered region of the carrier is configured to accommodate only a partial region of the recording medium, starting from the intake edge.

6. The inkjet printer according to claim 1, wherein the conveyor belt further comprises one or more additional aerodynamic elements, the aerodynamic element and the one or more additional aerodynamic elements being arranged spaced apart from one another on the conveyor belt to form a fill template configured to receive the recording medium.

7. The inkjet printer according to claim 1, wherein:
the conveyor comprises a floor that is configured to at least partially support the recording medium;
the aerodynamic element is configured such that an air flow produced by the relative motion between the print head and the recording medium travels at least in part below the floor; and
the floor is configured such that a suction force on the recording medium toward the floor is produced by the air flow traveling below the floor.

8. The inkjet printer according to claims 1, wherein:
the aerodynamic element is arranged in a region between two successive recording media; and
the printer is configured to print, using the print head, a regeneration print image and/or test print image onto the flat top side of the aerodynamic element for regeneration and/or monitoring of the one or more nozzles.

9. The inkjet printer according to claim 1, wherein the aerodynamic element is configured such that an air flow produced by the relative motion between the print head and the recording medium in the clearance below the nozzle plate is free or substantially free of eddies and/or turbulence at the intake edge of the recording medium.

10. The inkjet printer according to claim 1, wherein the recording medium is a sheet, page, or plate.

11. An inkjet printer for printing to a recording medium, comprising:
a print head having one or more nozzles arranged in a nozzle plate; and
a conveyor configured to move the recording medium in a transport direction relative to the print head to print a print image onto the recording medium and such that at least an intake edge of the recording medium is arranged at least partially below the nozzle plate, wherein a clearance below the nozzle plate corresponds to a reference clearance as of the intake edge, the conveyor including:
an aerodynamic element that is configured to converge the clearance below the nozzle plate on the reference clearance to match the reference clearance in a region that extends before the intake edge and starting from the intake edge with respect to the transport direction, wherein the aerodynamic element is arranged in a region between two successive recording media, the aerodynamic element including a flat surface that faces toward the nozzle plate,
wherein the printer is configured to print, using the print head, a regeneration print image and/or test print image onto the flat surface of the aerodynamic element for regeneration and/or monitoring of the one or more nozzles.

12. The inkjet printer according to claim 11, wherein the recording medium is a sheet, page, or plate.

13. A carrier for supporting a recording medium in a printer, comprising:

a body configured to accommodate at least a portion of the recording medium; and an aerodynamic element coupled to the body and arranged before the body with respect to a transport direction of the printer, the aerodynamic element including a planar top portion and an angled portion configured to direct an air flow to a bottom of the body of the carrier, wherein the planar top portion has a height that is greater or equal to a thickness of the recording medium.

14. The carrier according to claim 13, further comprising a second aerodynamic element coupled to the body and arranged after the body such that the recording medium accommodated by the body is positioned between the aerodynamic element and the second aerodynamic element with respect to the transport direction.

15. The carrier according to claim 13, wherein the body includes one or more apertures extending through the bottom of the body and configured to generate a suction force on the recording medium based on the air flow, the suction force forcing the recording medium towards the bottom of the body.

16. The carrier according to claim 14, wherein the body includes one or more apertures extending through the bottom of the body and configured to generate a suction force on the recording medium based on the air flow, the suction force forcing the recording medium towards the bottom of the body.

17. A printer, comprising:

the carrier according to claim 13; and a print head arranged above a transport that is configured to move the carrier and the print medium supported thereby through a clearance formed between the print head and the transport.

* * * * *